Patented Nov. 11, 1924.

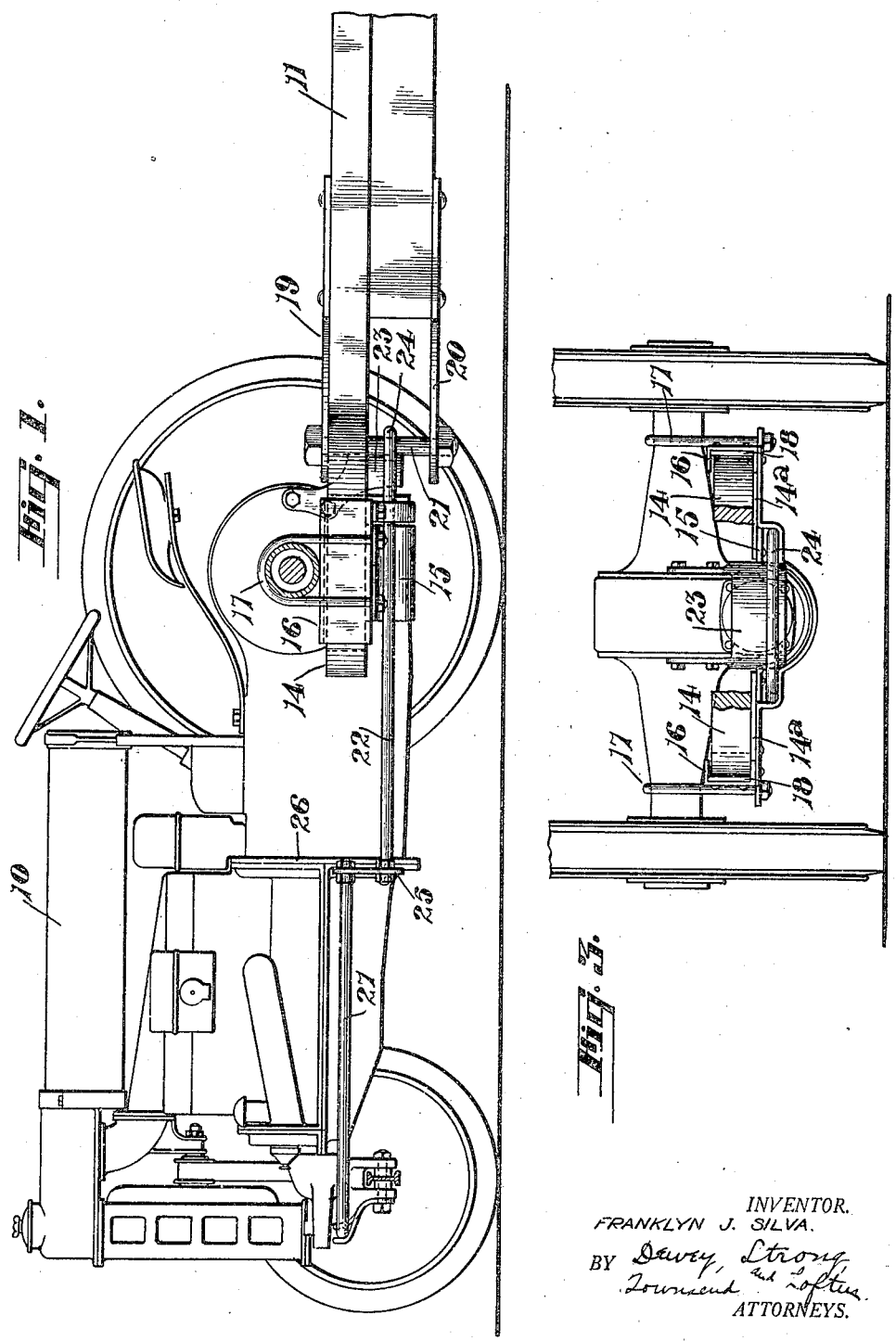

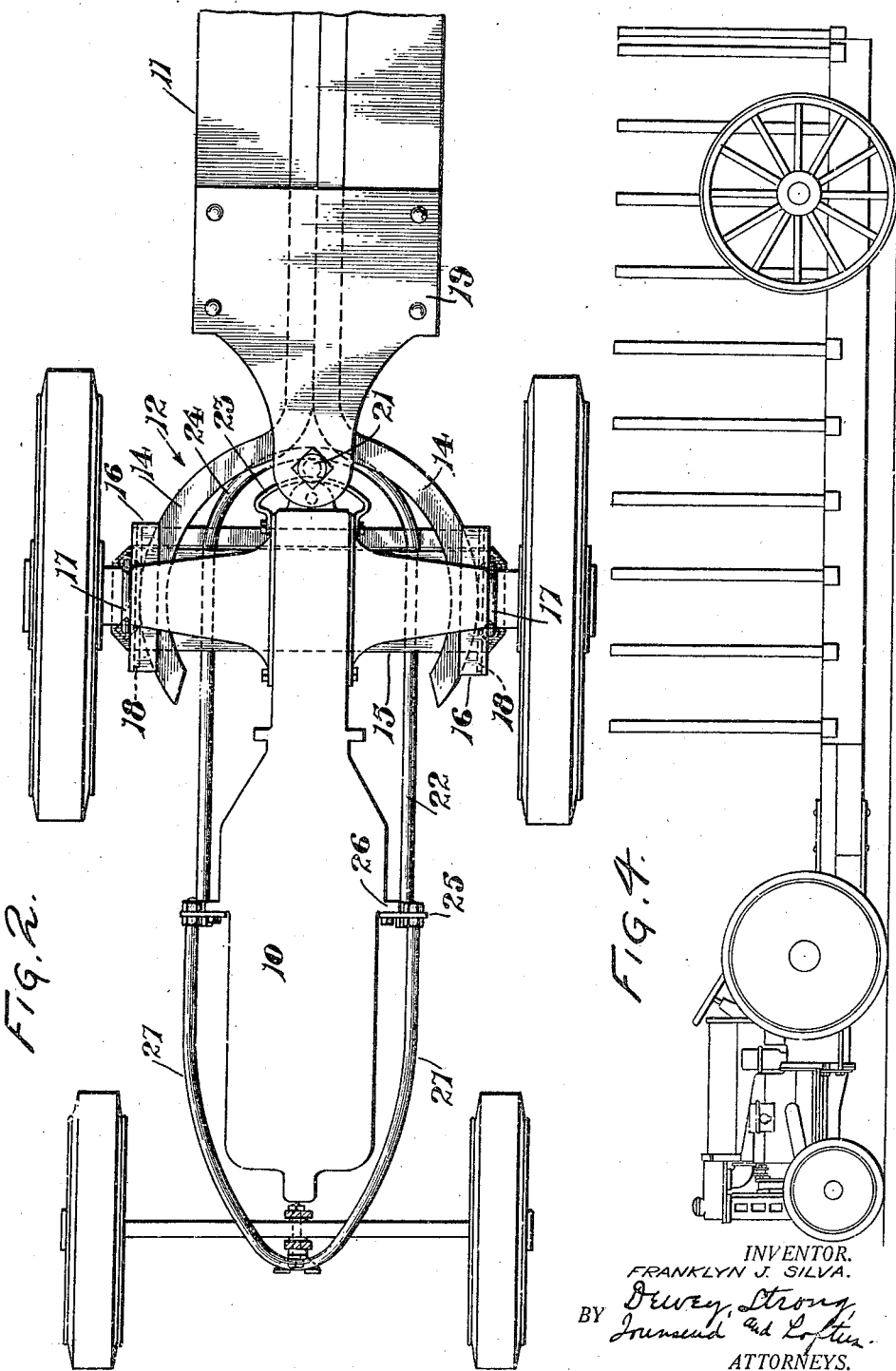

1,514,865

UNITED STATES PATENT OFFICE.

FRANKLYN J. SILVA, OF OAKLAND, CALIFORNIA, ASSIGNOR TO MOSES M. KAHN, OF SAN FRANCISCO, CALIFORNIA.

DRAWBAR ATTACHMENT FOR TRACTORS.

Application filed January 17, 1923. Serial No. 613,140.

*To all whom it may concern:*

Be it known that I, FRANKLYN J. SILVA, a citizen of the United States, residing at Oakland, county of Alameda, and State of California, have invented new and useful Improvements in Drawbar Attachments for Tractors, of which the following is a specification.

This invention relates to tractors and particularly pertains to means for adapting a tractor of the Fordson or like type to serve as a suitable traction means for heavy duty trailers.

Prior to the present invention several attempts have been made to assemble a tractor of the type mentioned with a low bed two-wheeled trailer, with the object in view of providing an economically operating freighting unit of large capacity.

In order to assemble this unit so that it could be comparatively easily maneuvered in the regular paths of traffic, it was necessary that the drawbar of the trailer be pivotally connected to the rear of the tractor. This imposes approximately half of the load of the trailer onto the tractor, and, since the weight of a tractor of this type is not sufficient to counterbalance this load, its front wheels will not remain on the ground while in operation. Several experimental methods have been tried in an effort to overcome this difficulty, but none of them have proven entirely successful.

Therefore, it is the principal object of the present invention to provide generally improved means for adapting a tractor of the type mentioned to duty as a power plant for trailers, which means embodies a draft mechanism for receiving the drawbar of the trailer, said mechanism being designed to distribute the pull throughout the tractor frame and also to support the load on the trailer in a manner to lower the center of gravity of the tractor and to assure that the front wheels of the latter will remain firmly on the ground when the tractor is in operation.

The invention is exemplified in the follow description and illustrated by way of example in the accompanying drawings, in which:

Fig. 1 is a side elevation of a tractor of the Fordson or like type, with parts broken away to disclose the preferred embodiment of the invention.

Fig. 2 is a skeleton plan view of the tractor showing the invention applied thereto.

Fig. 3 is a rear elevation of the rear axle assembly of the tractor disclosing certain details of the invention.

Fig. 4 is a side elevation of a freighting unit disclosing a tractor connected to a trailer by means of my improved drawbar connection.

Referring more particularly to the accompanying drawings, 10 indicates a tractor of the Fordson or like type and 11 a drawbar of a low bed two-wheeled dray or trailer.

It is intended that the present invention serve as an adequate coupling between the drawbar of the dray and the tractor, so that the two will operate as a unit. This provides a freighting unit of large capacity, moderate speed and one which is comparatively easy to maneuver along the regular paths of traffic.

The two wheels of the trailer are located adjacent the rear of the trailer to support a portion of the load. The remainder of the load is to be supported by the tractor.

For this purpose, the drawbar of the trailer includes a rigid yoke 12 comprising two bars having semi-circular ends 14. These ends, when the tractor is coupled to the dray, bear on wear plates 14ª, positioned directly below the center of the rear axle assembly of the tractor. The wear plates mentioned are firmly secured by headless rivets to a transverse plate 15 which extends beneath the differential housing of the tractor. The ends of this plate are securely fastened to sections of channel bars 16 positioned beneath the axle housing and firmly anchored thereto by means of U-bolts 17. The inner surfaces of the webs of these channel sections are fitted with side wear plates 18 between which the yoke 12 snugly fits. The yoke is free to turn between the side wear plates and serves to place the load on the tractor at a point directly below the center of the rear axle.

The drawbar 11 of the trailer is fitted with top and bottom plates 19 and 20 which are bored to receive a vertically disposed king pin 21. When the trailer is coupled to the tractor, the king pin 21 is dropped through the bore in the upper plate 19 and between a traction yoke 22 and a buffer plate 23. The traction yoke 22 is preferably U-shape with a semi-circular rear end 24. The buffer plate 23 is also segmental with its circular face positioned concentric to the rear end 24 of the traction yoke. The space between the rear face of the buffer plate and the front face of the traction yoke is sufficient to receive the king bolt. It is obvious by reference to Fig. 2, that when the tractor negotiates a turn, the king bolt is allowed to move in a circular path of travel so that a direct pull will be exerted on the drawbar to turn the trailer.

When backing, the buffer plate protects the end of the differential housing and permits the tractor to back the trailer while positioned at an angle thereto.

The ends of the traction yoke 22 are secured to segmental plates 25 bolted to front face of the flanges 26, which flanges connect the engine of the tractor to the transmission case. Also connected to these plates 25 are the ends of a strap 27 which is U-shaped and bears against the front face of the front axle mounting lug of the tractor. The mounting of the traction yoke 22 and the strap 27, distributes the pulling strain throughout the frame of the tractor.

When the tractor and trailer are turning, the ends of the drawbar yoke will limit the turning movement of the tractor by abutting against the sides of the differential housing of the tractor.

Due to the fact that the portion of the load borne by the tractor is applied directly below the center of the rear axle, there will be no tendency for the front wheels of the tractor to leave the ground. By employing the traction yoke 22, the pulling strain is imposed on the tractor independently of the direct load on the rear axle of the tractor and is distributed throughout the frame of the tractor. It is seen that the tractor may easily be disconnected from the trailer by simply withdrawing the king pin. By my invention I provide a vertically rigid draw bar on the trailer which is connected to the frame of the tractor by two load sustaining points of connection which are located below the frame of the tractor and in a position as to relieve that part of the tractor frame back of the center of the axle from down thrusts.

From the foregoing it is obvious that comparatively simple means have been provided, which adapt a tractor of the Fordson type to use as a power plant and traction means for heavy duty drays or trailers.

While I have shown the preferred form of the invention as now known to me, it is understood that various changes in its construction may be made without departing from the spirit of the invention as defined in the appended claims.

Having thus described my invention, what I claim and desire to secure by Letters Patent is:

1. Means for adapting a tractor of the type mentioned to duty as traction means for two-wheeled trailers, comprising means included in the drawbar of the dray and bearing on the frame of the tractor at the center of the rear wheels thereof, and other means connecting the drawbar of the trailer to the frame of the tractor in a manner whereby the pulling strain will be distributed over the entire frame of the tractor.

2. The combination with a tractor and a two wheeled trailer, of a hitch therebetween comprising a load sustaining drawbar vertically rigid with respect to the trailer, and a load sustaining connection between said draw bar and the frame of the tractor, said load sustaining connection being arranged below the rear axle of the tractor, and so positioned with respect to the rear axle of the tractor as to relieve that part of the tractor back of the center of the axle from down thrusts, and a pulling connection between drawbar and the tractor independent of said load sustaining connection.

3. Means for operatively connecting a tractor of the type described with a trailer for forming a freighting unit, comprising bearing means connected with the axle housing of the tractor, a yoke incorporated in the drawbar of the trailer, bearing on said bearing means adjacent the ends of the axle housing whereby to transmit the load directly to the rear tractor wheels, and a pulling connection between said drawbar and the frame of the tractor independent of said bearing means and said yoke.

4. Means for operatively connecting a tractor of the type described to a trailer for forming a freighting unit, comprising bearing means connected with the frame of the tractor, a yoke incorporated in the drawbar of the trailer, bearing on said bearing means upon opposite sides of the longitudinal center of the tractor whereby to transmit the load directly to the rear tractor wheels, and means connecting the drawbar to the frame of the tractor in a manner whereby the pulling strain will be distributed over the entire frame of the tractor.

5. In combination with a tractor and a trailer, of means for operatively connecting the same to form a freighting unit, comprising members secured to the frame of the tractor and positioned one adjacent each side thereof, a tranverse member connected at its ends to said members, a yoke incorporated in the drawbar of the trailer and bearing on said transverse member adjacent each end thereof, and a pulling connection between the drawbar and the tractor frame independent of said yoke.

6. In combination with a tractor and a trailer, of means for operatively connecting the same to form a freighting unit, comprising members securely anchored to the axle housing of the tractor and positioned one adjacent each end thereof, a transverse member connected at its ends to said members, a yoke incorporated in the drawbar of the dray and bearing on said transverse member adjacent each end thereof, a substantially semi-circular traction yoke secured to the frame of the tractor, a buffer plate secured to the tractor frame and formed substantially concentric with the traction yoke, a king pin carried by the drawbar and insertable between the traction yoke and the buffer plate.

7. In combination with a tractor and trailer, of means for operatively connecting the same to form a freighting unit, comprising members securely anchored to the axle housing of the tractor and positioned one adjacent each end thereof, a transverse member disposed directly beneath the axle and connected at its ends to said members, a yoke incorporated in the drawbar of the trailer and bearing on said transverse member adjacent each end thereof, a substantially semi-circular traction yoke secured to the frame of the tractor, a buffer plate secured to the tractor frame and formed concentric with the traction yoke, a king pin carried by the drawbar and insertable between the traction yoke and the buffer plate, and means connecting the traction yoke to the front and center of the tractor frame.

8. The combination with a tractor and a two-wheeled trailer, of a hitch therebetween comprising a yoke carried by the trailer and vertically rigid with respect thereto and extending beneath the rear axle of the tractor, means connecting said yoke with the frame of the tractor whereby to provide two load sustaining points of connection between the tractor and the trailer, which points are located beneath the frame of the tractor and in line with the rear axle of the tractor.

9. The combination with a tractor and a two-wheeled trailer, of a hitch therebetween comprising two load sustaining points of connection between the tractor and the trailer arranged below the frame of the tractor in a line with the center of the rear axle of the tractor, and a pulling connection between the tractor and trailer, said pulling connection being connected to the tractor frame forwardly of the rear axle of the tractor.

10. A hitch for transmitting the weight of the forward end of a two-wheel trailer to the frame of a tractor, comprising a load sustaining draft bar vertically rigid with the trailer frame and having members extending forwardly beneath the axle of the tractor and at either side of the differential housing, and a load carrying connection between each of said members and the frame of the tractor so positioned as to relieve that part of the tractor frame back of the center of the axle from down thrusts.

11. In combination with a tractor and a trailer, of means for forming a load sustaining connection therebetween comprising members secured to the frame of the tractor and positioned one adjacent each side thereof, a transverse member connected at its ends to said members and extending beneath the tractor frame, and a yoke connected with the trailer and vertically rigid with respect thereto, said yoke bearing on said transverse member adjacent each end thereof.

12. In combination with a tractor and a two wheeled trailer, of a hitch therebetween comprising a draw bar vertically rigid with respect to the trailer, bearing means disposed below the tractor frame and connected thereto, a yoke incorporated in the drawbar of the trailer and bearing on said bearing means at opposite sides of the longitudinal center of the tractor and at a point with respect to the rear axle of the tractor to relieve that part of the tractor frame back of the center of the rear axle from down thrusts.

13. In combination with a tractor and a two wheeled trailer, of a hitch therebetween comprising two load sustaining points of connection between the tractor and trailer, said points of connection being so arranged as to relieve that part of the tractor frame back of the center of the rear axle from down thrusts, and a pulling connection between the tractor and trailer, said pulling connection being independent of said load sustaining points of connection and connected to the tractor frame forwardly of the rear axle of the tractor.

FRANKLYN J. SILVA.